United States Patent Office 3,056,660
Patented Oct. 2, 1962

3,056,660
PRODUCTION OF PURE PHOSPHORUS
Forrest V. Williams, Dayton, Ohio, assignor to Monsanto Chemical Company, St. Louis, Mo., a corporation of Delaware
No Drawing. Filed Jan. 3, 1961, Ser. No. 79,995
2 Claims. (Cl. 23—223)

The present invention relates to the production of very pure phosphorus suitable for use in the manufacture of electronic and semiconductor materials such as intermetallic compounds and phosphorus doped compounds and elements and various types of doped compounds and elements.

It is an object of the invention to prepare phosphorus in a form which is relatively free from impurities and which is more uniform in its electrical characteristics as well as in its chemical derivatives than has been possible by prior art methods.

In the production of elemental phosphorus, it has been found that the chemical elements which occur together with the phosphorus are carried into the product. Examples of such impurities include the halogen elements such as fluorine, chlorine, etc., and also sulfur compounds. Certain forms of phosphorus such as the so-called white phosphorus which are stored under water or oil may also pick up impurities therefrom. It has been attempted to purify the elemental phosphorus by distillation, but the conventional distillation processes have been found to offer little improvement in the purity of the phosphorus which is thus obtained.

In the present process, the impure starting phosphorus is reacted with molten lead by contacting the vaporized phosphorus containing impurities with the lead at a temperature ranging from the melting point of lead to 1200° C., a preferred range being from 400° C. to 800° C. The various impurities which are present in the elemental phosphorus have been found to react with molten lead, while the phosphorus passes through the reaction zone without change other than the loss of the undesirable impurities. The relative proportions of the lead metal and the phosphorus may be varied over a wide range, although particularly good results are obtained with from 10% to 500% by weight of the metal relative to the weight of the phosphorus which is to be purified. The purification process is conducted with the lead metal in liquid or vapor form depending upon the temperature which is employed. The lead is preferably maintained as a molten bath through or over which the phosphorus vapor is passed. However, the entire reaction of purification may take place in the vapor phase such as by admixing a vapor stream of the volatilized phosphorus containing impurities together with a vapor stream of the lead, preferably at a reduced pressure such as at 1 to 100 mm. These two vapor streams are admixed in the aforesaid temperature range, after which the entire gas stream is cooled.

After the phosphorus has contacted the lead in liquid or vapor phase, the phosphorus stream is cooled. The cooling may proceed by a number of sequential steps ending at approximately room temperature. In this way, the first solid matter which is removed from the gas stream comprises the solid combination resulting from the reaction of the impurities in the phosphorus in the metal such as lead sulfide, as well as various other compounds with oxygen, selenium, tellurium, and the halogens such as fluorine, chlorine, bromine, and iodine. Upon further cooling, either in the aforesaid primary cooling zone or in a separate cooling zone, the lead metal is condensed and recovered as a solid or liquid while the phosphorus does not condense until relatively low temperatures such as about 50° C. (at 760 mm.) are reached.

The time of contacting is not critical, and may vary over wide ranges, such as for example, a small sealed tube system to a large molten bath of lead through which the phosphorus vapor is pumped.

The following example illustrates a specific embodiment of the invention. Fifteen grams of phosphorus was vaporized and passed over thirty grams of lead which was maintained at a constant temperature of 500° C. The lead was molten at this temperature, which increased the extent of contact between the metal and the gaseous impurities in the phosphorus vapor. The phosphorus vapor was passed over the molten lead at a rate of 3 grams per hour. After exposure of the phosphorus vapors to the lead, the vapors entered a condenser where the phosphorus was collected.

The treated phosphorus was converted to indium phosphide and the phosphide evaluated by electrical measurements. Typical impurity concentrations were $5-8 \times 10^{16}$ atoms/cc. This can be compared to values of $3-6 \times 10^{17}$ for InP prepared from untreated phosphorus.

What is claimed is:

1. Process for the purification of elemental phosphorus having in admixture therewith volatilizable impurities which comprises volatilizing the impure phosphorus and contacting the same with lead at a temperature ranging from the melting point of lead to 1200° C., and thereafter condensing purified phosphorus.

2. Process for the purification of elemental phosphorus having in admixture therewith volatilizable impurities which comprises volatilizing the impure phosphorus and contacting the same with lead at a temperature ranging from the melting point of lead to 1200° C., and thereafter condensing any volatilized metal and compounds formed by the reaction of the aforesaid impurities with the lead, and condensing purified phosphorus.

References Cited in the file of this patent

Mellor: "A Comprehensive Treatise on Inorganic and Theoretical Chemistry," vol. 8, 1928, page 849; vol. 7, 1927, pages 573 and 574. Longmans, Green and Co., N.Y.